No. 669,840.     Patented Mar. 12, 1901.
J. W. JONES & J. HELMER.
NUT LOCK.
(Application filed Oct. 16, 1900.)
(No Model.)
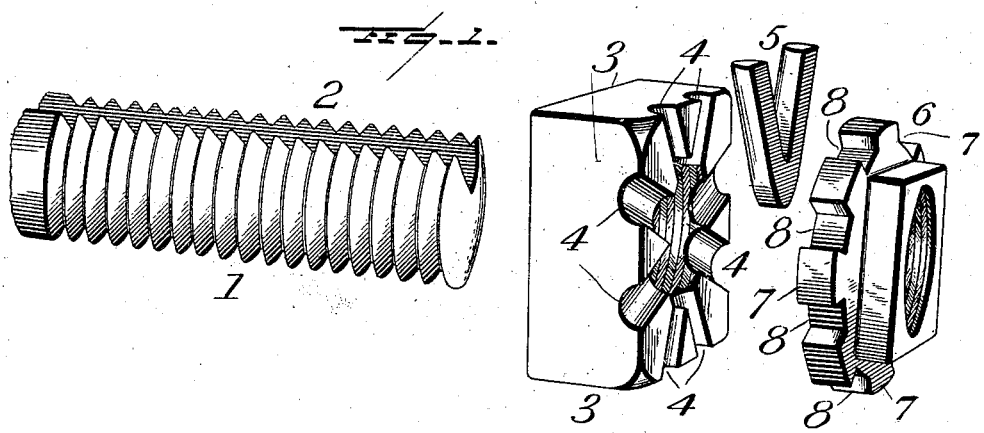
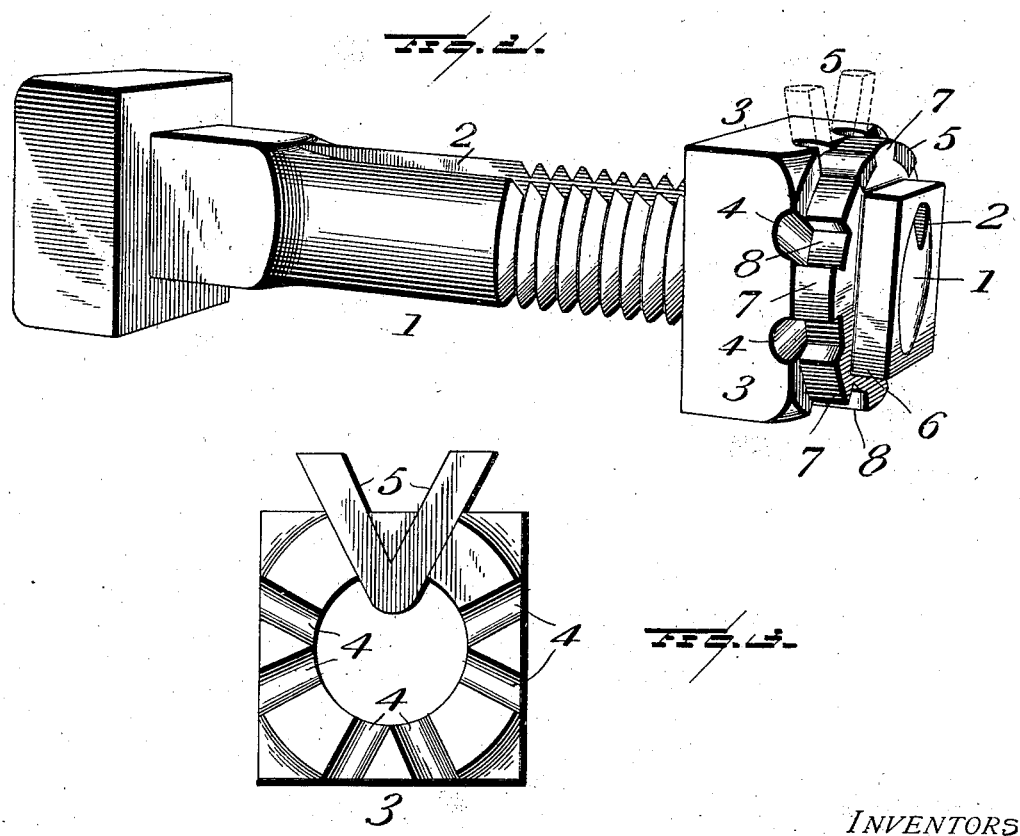
WITNESSES:
L. C. Hills
Grace O. Brewer
INVENTORS:
John W. Jones,
Joseph Helmer,
BY Sturtevant & Wruley
Attorneys

UNITED STATES PATENT OFFICE.

JOHN W. JONES AND JOSEPH HELMER, OF GRAND RAPIDS, MINNESOTA.

NUT-LOCK.

SPECIFICATION forming part of Letters Patent No. 669,840, dated March 12, 1901.

Application filed October 16, 1900. Serial No. 33,256. (No model.)

*To all whom it may concern:*

Be it known that we, JOHN W. JONES and JOSEPH HELMER, citizens of the United States, residing at Grand Rapids, in the county of Itasca, State of Minnesota, have invented certain new and useful Improvements in Nut-Locks, of which the following is a description, reference being had to the accompanying drawings and to the figures of reference marked thereon.

Our invention relates to nut-locks of the kind in which two nuts are used, one superposed upon the other; and it consists in means, as hereinafter described and claimed, by which both nuts may be locked upon a bolt against accidental displacement and at the same time the removal of the nuts be permitted when desired.

In the accompanying drawings, forming part of this specification, Figure 1 is a perspective view of the parts in position to be secured together. Fig. 2 is a perspective view of the parts in locked position. Fig. 3 is a plan view of the lower or main nut with the key in position.

Referring to the drawings, 1 is a bolt having a longitudinal groove 2 cut or otherwise formed therein.

3 is the lower or main nut. In its upper face this nut is provided with pairs of grooves 4, having a generally radial direction extending from the bolt-hole to the periphery of the nut. The grooves of each pair are arranged at an angle, so as to receive the V-shaped key 5. There may be as many pairs of these grooves 4 as desired. They are preferably of such depth that the upper surface of the key when in place will be flush with the upper surface of the nut. In use the apex of the V-shaped key enters the groove 2 of the bolt, the legs of the key lying in the grooves 4, thus preventing the rotation of the nut 3.

In order to prevent the removal of the V-shaped key, we provide the bolt with a second or locking nut 6, which fits the screw-threads of the bolt 1 and is screwed down onto the lower or main nut 3 to hold the key 5 in place. This second or locking nut is preferably formed with a flange 7, usually made of circular form, provided in its edge with notches or recesses 8, spaced apart a distance just sufficient to permit the ends of the legs of the V-shaped key to be bent up into them. By thus bending the ends of the legs of the key into these notches or recesses the second or locking nut is securely held from accidental displacement.

It will be readily understood from the above description that in use the main or lower nut 3 will first be screwed upon the bolt to the point desired, when the point of the key 5 will be inserted in the groove 2 and the legs of the key placed in the pair of grooves 4 which is in line with the groove. The locking-nut is then screwed firmly down onto the lower nut, holding the key in place. The outer ends of the legs of the key are then bent up into two of the notches or recesses 8 on the flange of the locking-nut.

The key 5 is preferably made of malleable metal, so that its ends may be bent out of the notches or recesses 8 to permit the locking-nut to be removed.

Having thus described our invention, what we claim as new, and desire to secure by Letters Patent, is—

1. The combination with a bolt, having a longitudinal groove therein, of a nut having radial pairs of grooves in its outer face, a V-shaped key adapted to rest in one of the pairs of grooves with its apex in the groove of the bolt and means for retaining the key in place, substantially as described.

2. The combination with a bolt, having a longitudinal groove therein, of a nut having radial pairs of grooves in its outer face, a V-shaped key adapted to rest in one of the pairs of grooves with its apex in the groove of the bolt, and a locking-nut adapted to be screwed down onto said nut for the purpose of retaining the key in place, substantially as described.

3. The combination with a bolt, having a longitudinal groove therein, of a nut having radial pairs of grooves in its outer face, a V-shaped key adapted to rest in one of the pairs of grooves with its apex in the groove of the bolt, and having its legs extending beyond the periphery of the bolt, and a locking-nut adapted to be screwed down onto the said nut and provided with a flange having recesses therein, adapted to receive the legs of the key when bent upward, substantially as described.

In testimony whereof we affix our signatures in presence of two witnesses.

JOHN W. JONES.
JOSEPH HELMER.

Witnesses:
FRANK F. PRICE,
A. E. KRIBS.